US010059186B2

(12) United States Patent
Ruder et al.

(10) Patent No.: US 10,059,186 B2
(45) Date of Patent: Aug. 28, 2018

(54) BEARING ARRANGEMENT FOR AN INTERMEDIATE SHAFT IN A DECOUPLING CLUTCH FOR A HYBRID MODULE, HAVING SEPARATE AXIAL AND RADIAL SUPPORT

(71) Applicant: Schaeffler Technologies AG & Co. KG, Herzogenaurach (DE)

(72) Inventors: Willi Ruder, Lahr (DE); Denys Oparin, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/306,889

(22) PCT Filed: May 5, 2015

(86) PCT No.: PCT/DE2015/200297
§ 371 (c)(1),
(2) Date: Oct. 26, 2016

(87) PCT Pub. No.: WO2015/176724
PCT Pub. Date: Nov. 26, 2015

(65) Prior Publication Data
US 2017/0050507 A1    Feb. 23, 2017

(30) Foreign Application Priority Data

May 23, 2014    (DE) .................. 10 2014 209 833

(51) Int. Cl.
*F16D 13/46*    (2006.01)
*F16D 13/50*    (2006.01)
(Continued)

(52) U.S. Cl.
CPC ............ *B60K 6/387* (2013.01); *B60K 6/40* (2013.01); *B60K 6/48* (2013.01); *H02K 7/006* (2013.01);
(Continued)

(58) Field of Classification Search
CPC .... F16D 13/46; F16D 13/50; F16D 2023/123; F16B 21/18; F16B 21/183; B60K 6/387; B60K 6/40; B60K 6/48
See application file for complete search history.

(56) References Cited

U.S. PATENT DOCUMENTS 3,832,076 A * 8/1974 Gehrke .................. F16B 21/18
403/359.5
4,605,114 A * 8/1986 Goetz ................... F16D 13/385
192/110 S
(Continued)

FOREIGN PATENT DOCUMENTS

CN    101927690 A    12/2010
CN    102099216 A    6/2011
(Continued)

Primary Examiner — Ramya Prakasam Burgess
Assistant Examiner — David R Morris
(74) Attorney, Agent, or Firm — Volpe and Koenig, P.C.

(57) ABSTRACT

A decoupling clutch for a hybrid module of a motor vehicle is disclosed. The decoupling clutch includes an intermediate shaft which is drivable by a crankshaft. A clutch disk is connected non-rotatingly to the intermediate shaft. A counter-pressure plate is connected to a transmission input shaft. The counter-pressure plate is connected non-rotatingly to the clutch disk at least when the decoupling clutch is in the engaged position. A first roller bearing radially supports the intermediate shaft. A carrier element radially supports a rotor of an electric motor. The first roller bearing is nested radially between a supporting section of the carrier element and an external circumferential surface of the intermediate shaft.

12 Claims, 3 Drawing Sheets

(51) Int. Cl.
  *B60K 6/387* (2007.10)
  *B60K 6/40* (2007.10)
  *B60K 6/48* (2007.10)
  *H02K 7/00* (2006.01)
  *F16D 28/00* (2006.01)
  *F16D 23/12* (2006.01)

(52) U.S. Cl.
  CPC ..... *B60Y 2200/92* (2013.01); *B60Y 2400/424* (2013.01); *B60Y 2400/48* (2013.01); *F16D 13/46* (2013.01); *F16D 13/50* (2013.01); *F16D 28/00* (2013.01); *F16D 2023/123* (2013.01); *F16D 2300/22* (2013.01); *Y10S 903/914* (2013.01)

(56) References Cited

U.S. PATENT DOCUMENTS

| | | | |
|---|---|---|---|
| 6,523,524 B1* | 2/2003 | Simon | F02M 59/102 123/450 |
| 8,960,393 B2* | 2/2015 | Frait | B60K 6/387 192/3.21 |
| 9,080,612 B2* | 7/2015 | Fujii | F16D 13/40 |
| 9,216,729 B2 | 12/2015 | Reitz | |
| 9,243,672 B2* | 1/2016 | Brevick | F16D 13/38 |
| 9,416,826 B2* | 8/2016 | Frait | B60K 6/405 |
| 9,579,965 B2* | 2/2017 | Frait | B60K 6/405 |
| 9,581,210 B2* | 2/2017 | Frait | B60K 6/405 |
| 2006/0230853 A1 | 10/2006 | Krauss et al. | |
| 2010/0326785 A1 | 12/2010 | Schrage | |
| 2011/0100736 A1 | 5/2011 | Bomtrager et al. | |
| 2013/0165294 A1* | 6/2013 | Reitz | B60W 20/00 477/5 |
| 2013/0192945 A1* | 8/2013 | Frait | B60K 6/405 192/3.21 |
| 2013/0192947 A1* | 8/2013 | Frait | B60K 6/387 192/3.32 |
| 2013/0313063 A1* | 11/2013 | Fujii | F16D 13/72 192/66.3 |
| 2014/0124318 A1* | 5/2014 | Frait | B60K 6/405 192/3.28 |
| 2014/0124321 A1 | 5/2014 | Frait | |
| 2015/0114787 A1* | 4/2015 | Brevick | F16D 13/38 192/66.32 |
| 2015/0211583 A1 | 7/2015 | Jugovic et al. | |
| 2017/0043657 A1* | 2/2017 | Schmitt | B60K 6/40 |
| 2017/0050506 A1* | 2/2017 | Trinkenschuh | F16D 25/0638 |
| 2017/0057489 A1* | 3/2017 | Schaefer | B60K 6/40 |

FOREIGN PATENT DOCUMENTS

| | | |
|---|---|---|
| DE | 102012221618 | 6/2013 |
| DE | 10 2014 212 799 A1 | 1/2015 |
| EP | 2613064 | 7/2013 |
| JP | H10252776 A | 9/1998 |
| JP | 2009220771 | 10/2009 |
| WO | 2014049241 | 4/2014 |

\* cited by examiner

BEARING ARRANGEMENT FOR AN INTERMEDIATE SHAFT IN A DECOUPLING CLUTCH FOR A HYBRID MODULE, HAVING SEPARATE AXIAL AND RADIAL SUPPORT

BACKGROUND

The invention relates to a decoupling clutch for a hybrid module of a motor vehicle such as a passenger car, truck, bus or agricultural utility vehicle, having an intermediate shaft which is drivable by a crankshaft of an internal combustion engine of the motor vehicle, a clutch disk which is connected non-rotatingly with the intermediate shaft, a counter-pressure plate which is connectible to a transmission input shaft of a transmission (for example a stepless CVT transmission) of the motor vehicle, which counter-pressure plate is connected non-rotatingly to the clutch disk, at least when the decoupling clutch is in the engaged position, a first roller bearing which supports the intermediate shaft at least radially, and a carrier element which is prepared for radial support of a rotor of an electric motor (and preferably in addition to receive a clutch actuating device). The invention also relates to a hybrid module having such a decoupling clutch.

Decoupling clutches which are built into hybrid modules are already known from the prior art. These hybrid modules preferably have rotor-integrated decoupling clutches, and are designed primarily for vehicles having maximum engine torques of 300 Nm. For these applications, no freewheeling mechanism is necessary in the decoupling clutch.

Exemplary embodiments according to the prior art are disclosed, for example, in DE 10 2012 221 618 A1. Here, a hybrid module has a fastening means for preferably separable attachment of the hybrid module to a torque transfer device such as a torque converter or clutch, in particular a dual clutch, where the hybrid module includes a driveshaft which is connectible to an internal combustion engine and is rotatable around an axis of rotation, and an electric motor having a stator and a rotor and a drive component which is connectible to the rotor. The torque transfer device has a transmitting component for connecting to the hybrid module, while the fastening means secures the drive component axially in relation to the transmitting component and the connection is producible between fastening means and transmitting component.

Furthermore, the applicant's in-house state of the art is known, which has already been submitted to the German Patent and Trademark Office as a German patent application (application date 15 Jul. 2013) but has not yet been published. This German patent application, no. DE 10 2013 213 824, discloses a bearing arrangement for an intermediate shaft in a decoupling clutch of a hybrid module. The decoupling clutch has an intermediate shaft in order to deliver torque from a crankshaft driven by an internal combustion engine to a transmission input, there being a central flange present which is fixed to the rotor and a clutch disk being fixed to a torque transfer element such as a toothed plate, and there being at least one pilot bearing present on the transmission side to support the intermediate shaft at least radially. Furthermore, the transmission-side pilot bearing is fitted in between the torque transfer element and the central flange.

It is also known from these embodiments of the prior art to support the intermediate shaft by means of two bearings. A bearing in most cases is a univalent radial bearing, and is located, for example, in the crankshaft or in the damper. A dual-value bearing is located on the transmission side in the rotor-integrated decoupling clutch. Up to now this second, bivalent bearing has always been located to the right of a toothed plate (on the side facing away when the crankshaft is operating). This enables the simple assembly of the components of the decoupling clutch, while it is necessary to use an additional bushing. The intermediate shaft is then pre-assembled with the second bearing of this bushing and the toothed plate, and is inserted into the clutch unit of the decoupling clutch. The complete assembly is then fixed axially by next attaching a flex plate.

However, these arrangements have the disadvantage that they take up a relatively large axial construction space. However, the axial construction space is of very restricted design, with engines having a torque of less than 300 Nm, in particular due to customer requirements.

SUMMARY

It is therefore the object of the present invention to remedy the disadvantages known from the prior art, and to further reduce the axial construction space of a decoupling clutch and of a hybrid module having a decoupling clutch.

This object is fulfilled according to the invention by the first roller bearing being nested radially between a supporting section of the carrier element and an outer circumferential surface of the intermediate shaft. Furthermore, the first roller bearing is preferably positioned radially inside the carrier element, in particular radially inside the hybrid module.

This makes it possible in particular to construct the decoupling clutch substantially more compactly in the axial direction. The first roller bearing can be moved into an axial region of the intermediate shaft that is substantially less critical with regard to the construction space, and that is present anyway due to the particular length of the intermediate shaft.

Additional advantageous embodiments are claimed in the subordinate claims, and are explained in greater detail below.

According to another embodiment, it is advantageous if the first roller bearing is in the form of a radial bearing. The design as a radial bearing, where it is preferably designed as a needle bearing/drawn cup needle roller bearing, also enables the radial construction space to be further optimized. This further reduces the construction space. As an alternative to the design as a needle bearing, it is also possible to design the radial bearing as a roller bearing. In this connection, it is also advantageous if the intermediate shaft is secured axially by means of a restraining ring which can be pre-tensioned in the radial direction toward the inside or toward the outside. This enables the previous (first) roller bearings known from the prior art to be divided into two separate components by their function, namely into the radial bearing, which is responsible for the radial support of the intermediate shaft and is of particularly space-saving design, and into the restraining ring, which is likewise inherently of a very space-saving design and secures the intermediate shaft in the axial direction. This further reduces the construction space.

It is also advantageous if, besides the first roller bearing, a second roller bearing is present which is of univalent design, preferably as a radial bearing. By further preference, this second roller bearing is attached at an end section of the intermediate shaft which is close to the internal combustion engine or facing toward the internal combustion engine when it is in operation. This second roller bearing additionally preferably supports the intermediate shaft directly in relation to the crankshaft of the internal combustion engine.

It is also expedient for the intermediate shaft to be connected on the crankshaft side non-rotatingly to a torsional vibration equalizing device which is connectible to the crankshaft, such as a single-mass flywheel or a dual-mass flywheel or a bow spring damper, by means of a sliding tooth system. In this connection, it is especially expedient for the restraining ring to then be pushed into a first groove in the torsional vibration equalizing device and into a second groove in the intermediate shaft. The (first and second) grooves preferably running continuously around the circumference are then positioned at the same level in the axial direction during assembly, so that the restraining ring is inserted simultaneously into both grooves and the intermediate shaft is secured relative to the torsional vibration equalizing device, which is connected non-rotatingly to the crankshaft when operating.

It is also preferred that the restraining ring be slotted. In this case, the restraining ring is preferably designed so that it is radially pre-tensioned toward the outside, i.e., it is larger than the groove floor of the second groove of the intermediate shaft. During installation in the hub/torsional vibration equalizing device, the restraining ring is pressed radially inward, into the groove floor of the second groove of the intermediate shaft, and the intermediate shaft together with the restraining ring is inserted in the axial direction into the hub of the damper/into the torsional vibration equalizing device. In this case, the existing first groove in the torsional vibration equalizing device is placed so that as soon as the restraining ring reaches the axial position of the first groove on the intermediate shaft it is pressed into the first groove by its radial pre-tensioning. The shaft is then fixed axially relative to the torsional vibration equalizing device. Alternatively to this, it is also possible however to pre-tension the restraining ring radially inward; i.e., for the restraining ring to have a radial pre-tensioning in the inward direction. The restraining ring would then first have to be pre-installed in the torsional vibration equalizing device, after which it then snaps into the second groove only upon installation of the intermediate shaft.

If the restraining ring is located in an axial region within the axial tooth system, use of the construction space on the intermediate shaft is further optimized.

In addition, it is advantageous if the first roller bearing is located in an axial half of the intermediate shaft that faces toward the transmission (when operating) and/or if the restraining ring is located in a second axial half of the intermediate shaft that faces away from the transmission (when operating), (i.e., faces toward the crankshaft). This leads to optimized support of the intermediate shaft.

It is also advantageous for the first roller bearing to be sealed toward the environment by means of sealing elements. Here, the first roller bearing is preferably designed as a greased roller bearing sealed on both sides (i.e., on both axial sides). As a result, the grease/bearing grease cannot escape from the roller bearing, and the greasing of the bearing is guaranteed for its service life. Furthermore, this has the advantage that the construction space taken up by the electric motor of the hybrid module (e-machine space) is sealed off from the space in which the torsional vibration equalizing device is located (damper space). This sealing may be necessary in particular to keep water out of the e-machine space, for example salty water which can penetrate into the damper space. The e-machine/electric motor and its current-bearing components must be protected from water, either by preventing water from entering the zone of the electric motor at all or by insulating the current-bearing components appropriately, which in turn however would be accompanied by an increased expense.

It is also advantageous if the torsional vibration equalizing device has chamfered edges, preferably in the area of the first groove, in order to further simplify assembly and disassembly.

The invention also relates to a hybrid module having a decoupling clutch according to one of the previously named embodiments, integrated into a rotor of an electric motor. By further preference, the hybrid module is prepared to be employed in a stepless CVT transmission. In addition, the hybrid module is preferably employed in an internal combustion engine in the form of a gasoline engine. The internal combustion engine/gasoline engine preferably has four cylinders and generates a maximum torque of 300 Nm (i.e., less than 300 Nm).

In other words, the intermediate shaft is supported between the DMF (dual-mass flywheel) output side and the clutch input side by means of a pilot bearing (second roller bearing), in most cases univalent, in the crankshaft, and a transmission-side bearing (first roller bearing), in most cases bivalent. The first roller bearing is now positioned radially inside the support/carrier element. The bivalent bearing on the transmission side (first roller bearing) is replaced by two components in order to save axial construction space. On the one hand, a drawn cup needle roller bearing (first roller bearing) is provided radially between the shaft/intermediate shaft and the support/carrier element of the hybrid module, i.e., radially inside the hybrid module. This bearing serves to provide radial support. For axial support, a restraining ring is provided on the transmission side. By means of one groove each in the shaft and in the hub (hub section) of a damper (torsional vibration equalizing device), after the shaft has been pushed into the damper the restraining ring is able to secure the shaft against axial displacement relative to the damper.

When the clutch of the hybrid module is engaged, the friction disks themselves have the effect of guiding the shaft. A preferred use of the hybrid module is in combination with a CVT transmission. It is thus possible to create a decoupling clutch in which the former first roller bearing is replaceable by a drawn cup needle roller bearing/needle bearing which provides the radial support of the intermediate shaft, and a restraining ring. The restraining ring serves to support the intermediate shaft axially, and is preferably fixed in a hub of the damper/torsional vibration equalizing device. Support of the intermediate shaft is necessary when the decoupling clutch is disengaged, in order to hold the intermediate shaft in its axial and radial position. When the clutch is engaged, the shaft is also guided by means of the toothing between the clutch disk and a toothed plate.

BRIEF DESCRIPTION OF THE DRAWINGS

The invention will now be explained in greater detail below on the basis of figures, in connection with which a plurality of embodiments are suggested.

The figures show the following.

DETAILED DESCRIPTION OF THE PREFERRED EMBODIMENTS

The figures are merely schematic in nature, and serve only to aid in understanding the invention. The same elements are provided with the same reference labels. Details of the different embodiments may be combined with one another or exchanged with one another.

Figure 1:
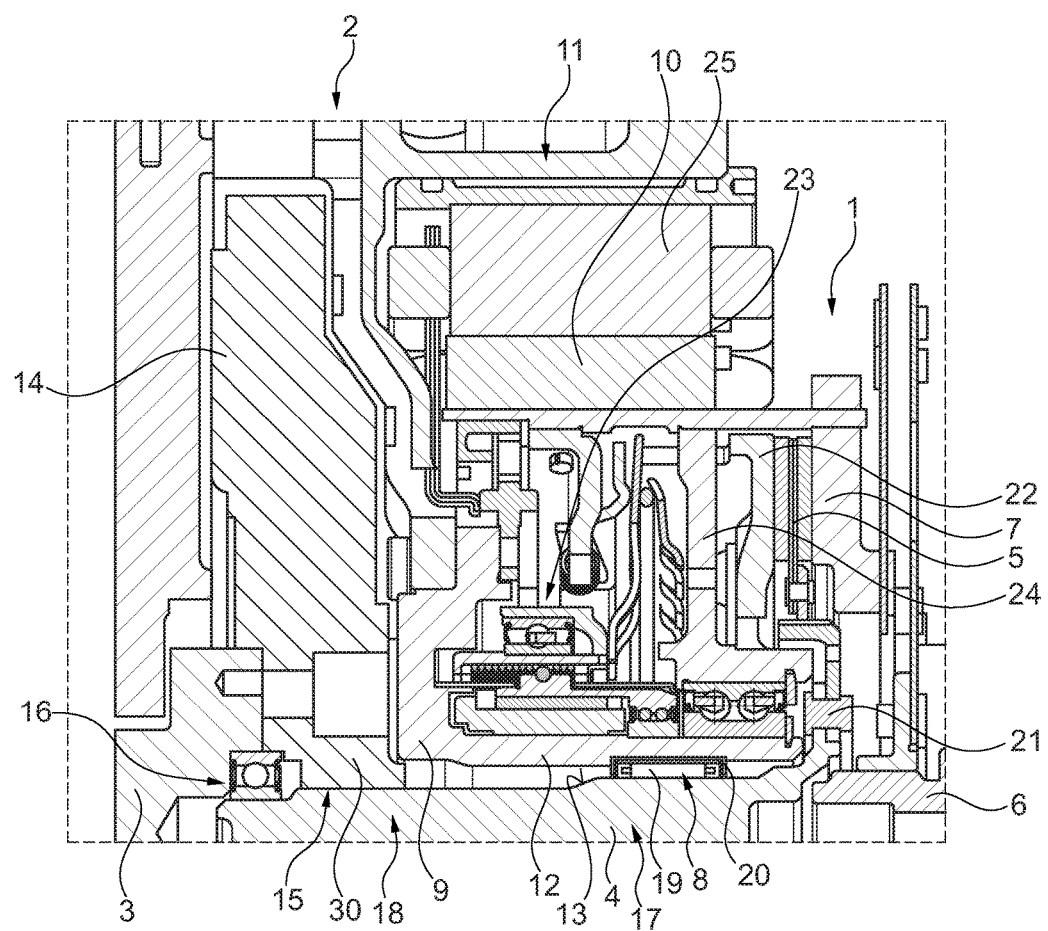
FIG. 1 a longitudinal sectional depiction of a hybrid module according to the invention, together with a first embodiment of a decoupling clutch according to the invention, wherein the sectional plane runs along the axis of rotation of the decoupling clutch and in particular the arrangement of the first roller bearing in the form of a radial bearing is clearly recognizable, FIG. 2 a longitudinal sectional depiction of a hybrid module according to the invention, together with another, second embodiment of a decoupling clutch according to the invention, which section is taken, as already in FIG. 1, along a plane in which the axis of rotation also runs, wherein this second embodiment has, besides a roller bearing in the form of a needle bearing, a restraining ring between the intermediate shaft and a torsional vibration equalizing device, and FIG. 3 a detail view of the region identified in FIG. 2 as III, which shows the restraining ring between the torsional vibration equalizing device and the intermediate shaft in detail.
Figure 2:
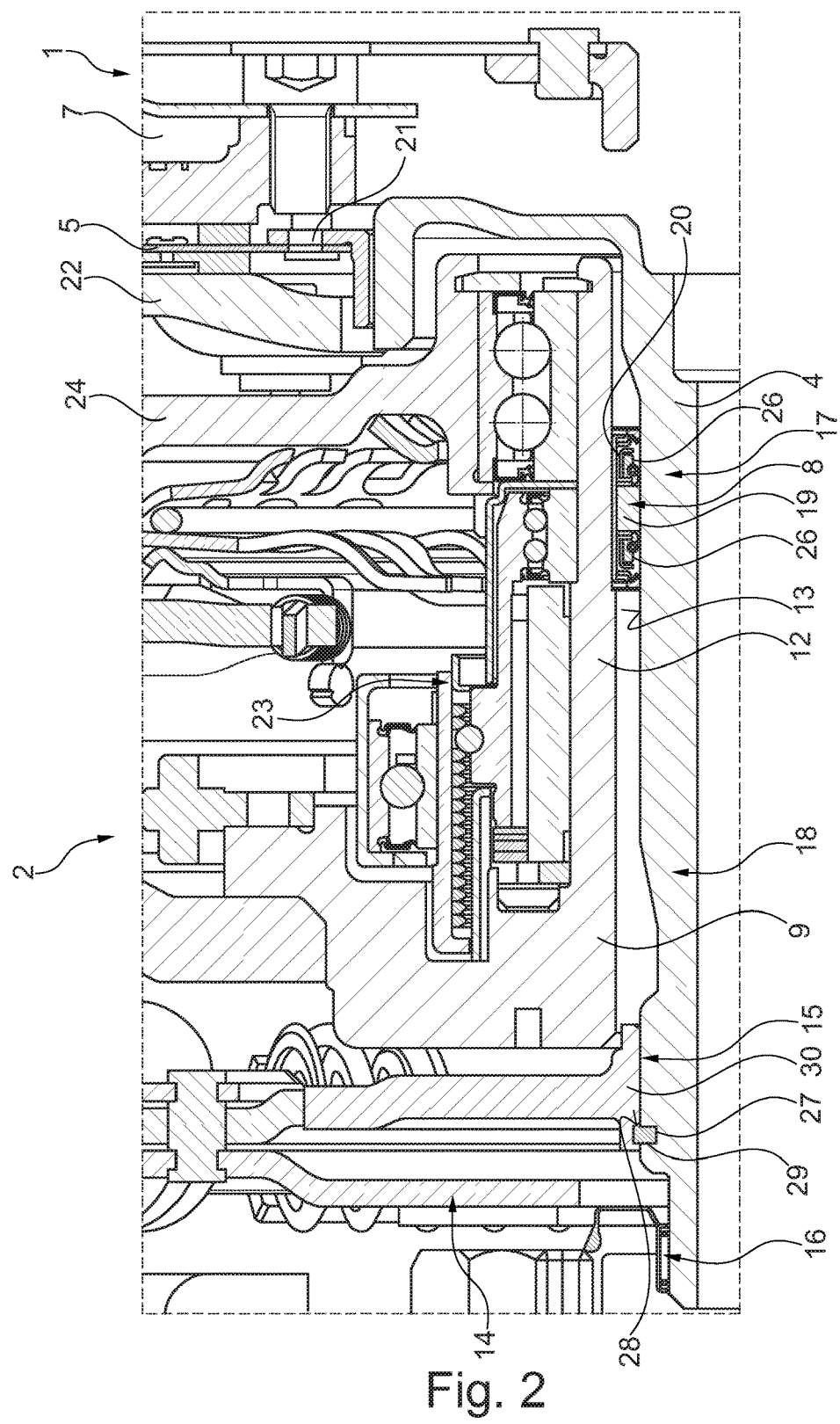
Figure 3:
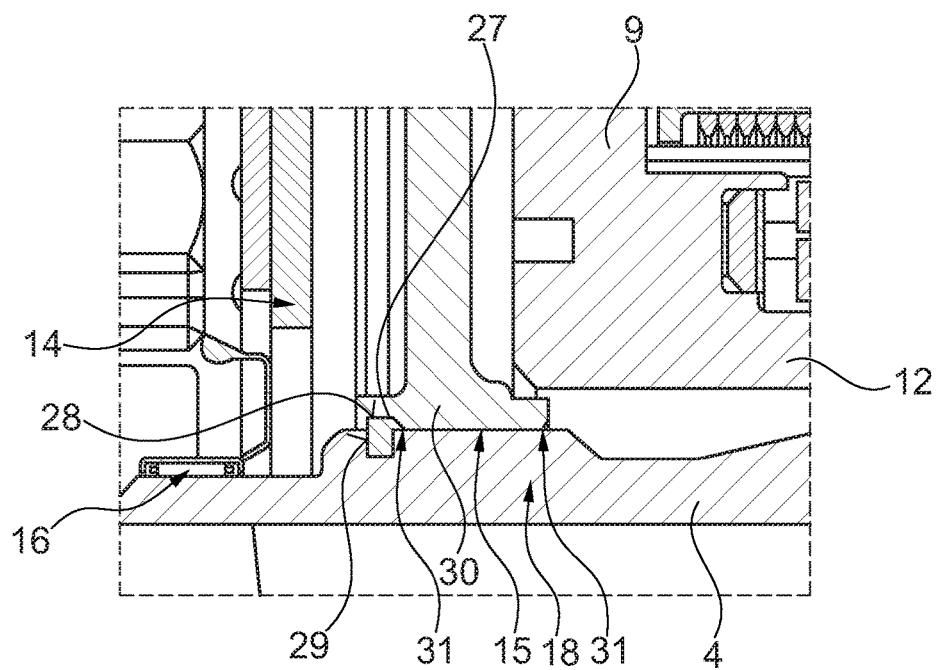

In the two embodiments as depicted in FIGS. 1 through 3, a decoupling clutch 1 according to the invention for a hybrid module 2 of a motor vehicle such as a passenger car, truck, bus or agricultural utility vehicle is always depicted. The decoupling clutch 1 in these cases always has a centrally located intermediate shaft 4 which is drivable by a crankshaft 3. The decoupling clutch 1 also has a clutch disk 5 which is connectible non-rotatingly to the intermediate shaft 4, as well as a counter-pressure plate 7 which is connectible to a transmission input shaft 6. The counter-pressure plate 7 is connectible non-rotatingly to the clutch disk 5, at least when the decoupling clutch 1 is in an engaged position. Furthermore, the decoupling clutch 1 has a first roller bearing 8 which is designed to support the intermediate shaft 4 radially. In addition, a carrier element 9, which is prepared to brace a rotor 10 of an electric motor 11 radially, is supported solidly on the hybrid module housing/decoupling clutch housing. Besides the property that the carrier element 9 supports/braces the rotor 10 of the electric motor 11 at least in the radial direction, the carrier element 9 is designed so that it holds a clutch actuating device 23, in particular a release bearing of the clutch actuating device 23.

The first roller bearing 8 is positioned in a nested arrangement radially/radially nested between a supporting section 12 of the carrier element 9 and an outer circumferential surface 13 of the intermediate shaft 4.

With regard to the two embodiments of the decoupling clutch 1 and of the hybrid module 2 depicted in FIGS. 1 through 3, let it also be mentioned that they are designed essentially like the disclosed hybrid module and the disclosed torque transfer device in DE 10 2012 221 618 A1; the content of that document is therefore to be regarded as integrated herein.

FIG. 1 first depicts details of a first embodiment of the decoupling clutch 1 according to the invention. As can be seen readily there, on the side of the internal combustion engine—with the internal combustion engine not being shown in the interest of clarity—the intermediate shaft 4 is connected non-rotatingly by means of a torsional vibration equalizing device 14, in this case a single-mass flywheel, to the crankshaft 3 of the internal combustion engine, which is preferably implemented as a reciprocating gasoline or diesel engine. The torsional vibration equalizing device 14 is connected by its face to the crankshaft 3 and is attached thereto non-rotatingly. The intermediate shaft 4 is connected to the torsional vibration equalizing device 14 by means of a sliding tooth system 15, wherein the radial inner side of a hub section 30 of the torsional vibration equalizing device 14 has a toothed section of the sliding tooth system 15 which is meshed positively with the complementarily designed toothed section of the sliding tooth system 15 on the outer circumferential surface 13 of the intermediate shaft 4. This leads to a non-rotating connection of the intermediate shaft 4 and the torsional vibration equalizing device 14 with the hybrid module 2/decoupling clutch 1 in the operating state. The sliding tooth system 15 may also be designed as spline toothing.

Besides the first roller bearing 8, the intermediate shaft 4 is supported additionally in the radial direction by means of a second roller bearing 16. In this embodiment, the second roller bearing 16 is designed as a ball bearing, and preferably a univalent bearing, i.e., a bearing that preferably transmits exclusively forces in the radial direction. The second roller bearing 16 is thus likewise a radial bearing. The second roller bearing 16 is positioned so that it is mounted with its inner ring on an external circumferential surface/the outside circumferential surface 13 of the intermediate shaft 4 and is connected by an outer bearing ring to the crankshaft and/or the torsional vibration equalizing device.

The intermediate shaft 4 extends centrally in the hybrid module 2 and in the decoupling clutch 1 by a certain length. In this case, the intermediate shaft 4 may be divided into two halves with regard to its length, where a first (axial) half 17 is the half which faces away from the crankshaft 3; a second (axial) half 18 which adjoins the first half 17 is the half which faces toward the crankshaft 3. The second roller bearing 16 is located on this second half 18. The first roller bearing 8 is located in turn on the first half 17.

The first roller bearing 8 is designed here as a roller bearing/needle bearing (needle bearing also referred to as a drawn cup needle roller bearing). The first roller bearing 8 is located radially inside the carrier element 9 and radially inside the hybrid module 2. The rolling surfaces of the roller elements 19 of the first roller bearing 8 lie directly on the external circumferential surface of the intermediate shaft 4. A bearing bush 20 of the first roller bearing 8 is fastened non-rotatingly in the supporting section 12, which is essentially sleeve-shaped and also extends in the axial direction. The bearing bush 20 is fastened non-rotatingly in the supporting section 12. For radial support, the roller elements 19, which are designed as needles/rollers in the case of a needle bearing, then roll around the circumference of the external circumferential surface and around the circumference of the inner surface of the bearing bush 20.

In an axial end region of the intermediate shaft 4, which end region faces away from the crankshaft 3, the clutch disk 5 in turn is then connected non-rotatingly to the intermediate shaft 4 by means of rivets 21. In this case, the clutch disk 5 is part of a first clutch part of the decoupling clutch 1. Also part of this first clutch part is a counter-pressure plate 7 which is connected non-rotatingly to the rotor 10, as well as an axially movable contact plate 22. The contact plate 22 is movable with the help of a clutch actuating device 23, the purpose of the clutch actuating device 23 being to move the contact plate 22 back and forth between an engaged position, in which the clutch disk 5 is connected non-rotatingly to the counter-pressure plate 7, and a disengaged position, in which the clutch disk transmits no torque to the counter-pressure plate 7.

Furthermore, the rotor 10 is braced and positioned relative to the supporting section 12 of the carrier element 9 by means of a central flange 24. Besides the rotor 10, the electric motor 11 has a stator 25, which drives the rotor 10 in an operating state of the electric motor 11. The stator 25 is mounted solidly on the hybrid module housing/decoupling clutch housing.

FIG. 2 shows in addition a second embodiment of the decoupling clutch 1 according to the invention, which second embodiment is designed essentially like the first embodiment according to FIG. 1. The forms and designs of the hybrid module 2 and of the decoupling clutch 1 thus also apply to the second exemplary embodiment. The following section will examine only the differences between these two exemplary embodiments.

As can be seen clearly in FIG. 2 on the first half 17 of the intermediate shaft 4, which is designed here as a hollow shaft, the first roller bearing 8 on the other hand is designed as a roller/needle bearing, but in this embodiment it is sealed toward the environment, i.e., in the axial direction, by means of two sealing elements/sealing rings 26. Thus, the interior of the first roller bearing 8 is sealed from the environment. Since the first roller bearing 8 is a greased roller bearing, the grease inside the roller bearing 8 is protected from external influences. This further improves the durability of the first roller bearing 8 in particular.

As can also be seen, also present on the second half 18, in addition to the first roller bearing 8, is a restraining ring 27 for axial securing/secure positioning of the intermediate shaft 4. In the operating state, this restraining ring 27 is snapped/inserted both into a first groove 28 in the torsional vibration equalizing device 14 and into a second groove 29 in the intermediate shaft 4. Thus, as this is carried out, the intermediate shaft 4 is secured axially relative to the torsional vibration equalizing device 14, which torsional vibration equalizing device 14 in turn in the operating state is located firmly on the crankshaft 3, namely firmly in the axial direction and firmly in the radial direction on this crankshaft 3. In this embodiment, the torsional vibration equalizing device 14 is designed as a dual-mass flywheel.

The first groove 28 and the second groove 29 are located in the axial area of the sliding tooth system 15. The first groove 28 is formed in the torsional vibration equalizing device 14 in the area of the sliding tooth system 15, and the second groove 29 is formed in the intermediate shaft in the area of the sliding tooth system 15. The two grooves 28 and 29 each run continuously around the circumference. The restraining ring 27, which is pre-tensioned radially inward or outward, is inserted both into the second groove 29 of the intermediate shaft 4 and into the first groove 28 of the torsional vibration operating device 14 in the operating state. The two grooves 28 and 29 are positioned at the same level in the axial direction during assembly, so that the restraining ring 27 is inserted simultaneously into both grooves and the intermediate shaft 4 is secured relative to the torsional vibration equalizing device 14, which is connected non-rotatingly to the crankshaft 3 when operating.

As also shown in FIG. 2, the second roller bearing 16 is not designed as a ball bearing as in FIG. 1, but likewise as a needle bearing (alternatively also as a roller bearing).

As can also be seen in the detail view according to FIG. 3, the torsional vibration equalizing device 14 has two chamfered edges 31 in the area of the hub section 30, in which the sliding tooth system 15 and the first groove 28 are formed, which chamfered edges run at essentially 45°, where a first chamfered edge 31 adjoins the first groove 28 (i.e., it bevels an edge of the groove 28), while the second chamfered edge 31 is formed on a radial inner side of an end of the hub section 30 which faces away from the crankshaft 3 in the operating state. This further simplifies the assembly.

In other words, a decoupling clutch 1 with bearing (first roller bearing 8) is thus provided for radial support of the shaft/intermediate shaft 4, which is located so that it requires no additional axial construction space. This is guaranteed in this construction by the fact that the bearing 8 is positioned radially inside this support/carrier element 9. The bearing 8 is arranged/designed as a greased needle bearing sealed on both sides/as a sealed, greased drawn cup needle roller bearing. The axial fixing of the shaft 4 is guaranteed by the restraining ring 27. The restraining ring 27 is slotted, and in the embodiment shown (second embodiment) is pre-installed in a slot in each case in the shaft 4 in the area of the sliding tooth system 15. The restraining ring 27 is pre-tensioned radially outward, so that it is larger than the groove floor of the shaft groove (second groove 29). During installation in the hub/the hub section 30 of the damper/the torsional vibration equalizing device 14, the ring/restraining ring 27 is pressed radially inward into the groove floor of the shaft 4, and the shaft 4 with the restraining ring 27 can thereupon be pushed into the hub 30 of the damper 14. A groove (first groove 28) is in turn likewise located in the hub 30 of the damper 14. As soon as the restraining ring 27 on the shaft 4 reaches the axial position of the groove 28 in the hub 30 of the damper 14, it is pressed by its radial pre-tensioning into the groove 28 of the hub 30 of the damper 14. The shaft 4 is then fixed axially to the hub section 30 of the damper 14. Alternatively, it is also possible for the restraining ring 27 to be pre-installed in the hub 30 of the damper 14 and to be pre-tensioned radially inward. Disassembly of the system is also possible in principle.

Furthermore, the forces for installing or uninstalling the shaft 4 in the hub 30 are set in a certain range by chamfered edges 31 of the hub 30 or of the groove 28. The installation force for installing the shaft 4 in the hub 30 can be set by means of the angle and the size of the first chamfered edge/chamfer. The disassembly force for uninstalling the shaft 4 from the hub 30 of the damper 14 can be set by means of the angle and size of the other chamfer 31.

REFERENCE LABELS decoupling clutch
2 hybrid module
3 crankshaft
4 intermediate shaft
5 clutch disk
6 transmission input shaft
7 counter-pressure plate
8 first roller bearing
9 carrier element
10 rotor
11 electric motor
12 supporting section
13 external circumferential surface
14 torsional vibration equalizing device
15 sliding tooth system
16 second roller bearing
17 first half
18 second half
19 roller element
20 bearing bush
21 rivet
22 contact plate
23 clutch actuating device
24 central flange
25 stator
26 sealing element/sealing ring 27 restraining ring
28 first groove
29 second groove
30 hub section
31 chamfered edge

The invention claimed is:

1. A decoupling clutch for a hybrid module of a motor vehicle, comprising an intermediate shaft which is drivable by a crankshaft, a clutch disk which is connected non-rotatingly to the intermediate shaft, a counter-pressure plate which is connectable to a transmission input shaft, said counter-pressure plate is connected non-rotatingly to the clutch disk at least when the decoupling clutch is in an engaged position, a first roller bearing which supports the intermediate shaft at least radially, and a carrier element which is adapted for radial support of a rotor of an electric motor, and the first roller bearing is nested radially between a supporting section of the carrier element and an external circumferential surface of the intermediate shaft, and rolling surfaces of roller elements of the first roller bearing directly contact the external circumferential surface of the intermediate shaft.

2. The decoupling clutch according to claim 1, wherein the first roller bearing is a radial bearing.

3. The decoupling clutch according to claim 1, wherein the first roller bearing is a needle bearing.

4. The decoupling clutch according to claim 1, wherein the intermediate shaft is secured axially by a restraining ring which is pre-tensionable inward or outward in a radial direction.

5. The decoupling clutch according to claim 4, wherein the intermediate shaft is connected non-rotatingly on a crankshaft side by a sliding tooth system to a torsional vibration equalizing device which is connectable to the crankshaft.

6. The decoupling clutch according to claim 5, wherein the restraining ring is inserted into a first groove in the torsional vibration equalizing device and into a second groove in the intermediate shaft.

7. The decoupling clutch according to claim 5, wherein the restraining ring is positioned in an axial region inside the sliding tooth system.

8. The decoupling clutch according to claim 1, wherein the first roller bearing is positioned in an axial half of the intermediate shaft that faces toward a transmission.

9. The decoupling clutch according to claim 1, wherein the first roller bearing is sealed from the environment by sealing elements.

10. A hybrid module comprising the decoupling clutch according to claim 1, integrated into a rotor of an electric motor.

11. The decoupling clutch according to claim 1, wherein the first roller bearing includes a bearing bush nested within and axially retained by the supporting section of the carrier element.

12. A decoupling clutch for a hybrid module of a motor vehicle, the decoupling clutch comprising:
an intermediate shaft adapted to be driven by a crankshaft,
a clutch disk connected non-rotatingly to the intermediate shaft,
a counter-pressure plate connectable to a transmission input shaft, the counter-pressure plate connected non-rotatingly to the clutch disk at least when the decoupling clutch is engaged,
a first roller bearing radially supporting the intermediate shaft, the first roller bearing including needle rollers, and
a carrier element adapted to support a rotor of an electric motor,
wherein the first roller bearing is nested radially between a supporting section of the carrier element and a radially outer surface of the intermediate shaft, such that the needle rollers directly contact the radially outer surface of the intermediate shaft.

* * * * *